United States Patent [19]

Leach

[11] Patent Number: 5,009,014
[45] Date of Patent: Apr. 23, 1991

[54] RAILROAD RAIL PROFILE MEASURING SYSTEM

[75] Inventor: David J. Leach, Ludington, Mich.

[73] Assignee: Pandrol Jackson, Inc., Ludington, Mich.

[21] Appl. No.: 307,847

[22] Filed: Feb. 7, 1989

[51] Int. Cl.$^5$ .......................... B61K 9/00; G01B 5/20
[52] U.S. Cl. ............................ 33/287; 33/523.1; 33/1 Q; 73/146
[58] Field of Search .............. 33/551, 554, 546, 555, 33/556, 523, 1 Q, 287, 651, 651.1, 523, 523.1; 73/146

[56] References Cited

U.S. PATENT DOCUMENTS

| | | |
|---|---|---|
| 3,353,404 | 11/1967 | Swift .................................. 73/146 |
| 3,735,495 | 5/1973 | Plasser et al. .................... 33/523 X |
| 3,857,183 | 12/1974 | Plasser et al. .................... 33/1 Q X |
| 4,069,590 | 1/1978 | Effinger .............................. 33/523 |
| 4,075,888 | 2/1978 | Buhler ................................ 73/146 |
| 4,288,855 | 9/1981 | Panetti . |
| 4,288,926 | 9/1981 | Long et al. . |
| 4,391,134 | 7/1983 | Theurer et al. . |
| 4,417,466 | 11/1983 | Panetti . |
| 4,577,494 | 3/1986 | Jaeggi . |
| 4,625,412 | 12/1986 | Bradshaw . |
| 4,674,194 | 6/1987 | Riley . |

Primary Examiner—Daniel M. Yasich
Attorney, Agent, or Firm—Warner, Norcross & Judd

[57] ABSTRACT

An apparatus for measuring the profile of a rail head includes a base, an actuating unit, a carriage and a sensing device. These components cooperate to laterally move the sensing device across the width of the rail as it is moved longitudinally along the length of the rail, so that a single sensing element may be used to measure the profile of the rail head.

24 Claims, 3 Drawing Sheets

RAILROAD RAIL PROFILE MEASURING SYSTEM

BACKGROUND OF THE INVENTION

The present invention pertains to a railroad rail profile measuring system for use in the development of a rail grinding pattern.

Railroad rails over the course of time, due to the severe conditions and forces to which they are subjected, are deformed from their original desired configuration. The particular deformations at any point in the rail is varied depending on many factors, such as loads applied to the rails and amount of track curvature. Left unchecked, the shape of the rail degrades to a point wherein replacement is necessary. Rail replacement is an extremely costly and time consuming task which is best delayed as long as possible.

Profile rail grinding has gained increased popularity in the last several years as an effective procedure lengthening the usable life of the rail. In particular, maintenance or preventive grinding eliminates potential defects in the rail's profile before they develop to any significant extent. This approach not only increases the rail's useful life, but also actually decreases the number of grinding passes which must be made on the rail over a length of time.

However, in order to effectively employ such preventive grinding, the rail profile must first be accurately measured and analyzed. In the past, measuring devices have provided a complex arrangement of sensors clustered about the rail to take measurements of the rail head configuration. An example of such a device is disclosed in U.S. Pat. No. 4,577,494, Mar. 25, 1986 to Jaeggi, and entitled APPARATUS AND METHOD FOR MEASURING THE WEAR OF RAILROAD RAIL. While such a device provides the needed information, the complexity of the sensing apparatus causes the cost of manufacturing and maintenance requirements to be high.

Also, systems utilizing complex arrangements of cameras and strobe lights, and large arrays of computers have been recently developed to measure the profile of the rail. However, due to the complexity of the system, the costs have thus far been prohibitively high. Moreover, the obtained results have failed to be consistently accurate.

SUMMARY OF THE INVENTION

The aforementioned problems are overcome in the present invention by providing an accurate rail measuring apparatus wherein a single sensor element monitors the entire rail head profile. The single sensor element is movably mounted to a carriage for reciprocal lateral movement across the rail head as it is concurrently moved longitudinally down the rail. This construction facilitates an accurate and quick measuring operation. Moreover, due to the greatly reduced complexity of the apparatus, lower manufacturing costs and reduced maintenance requirements are realized.

These and other objects, advantages and features of the invention will be more readily understood and appreciated by reference to the detailed description of the preferred embodiment and the drawings.

DETAILED DESCRIPTION OF THE PREFERRED EMBODIMENT

Figure 5:
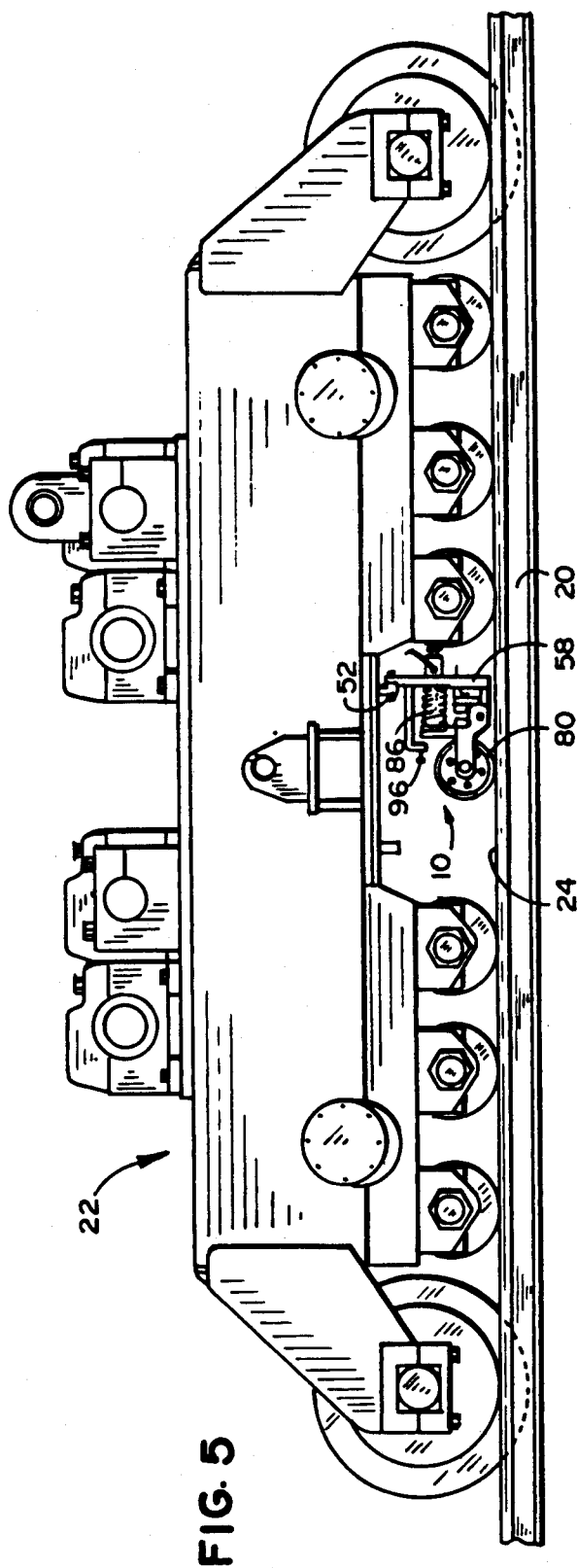
FIG. 5 is a side elevational view of the rail measuring apparatus mounted to a rail trolley.
Figure 7:
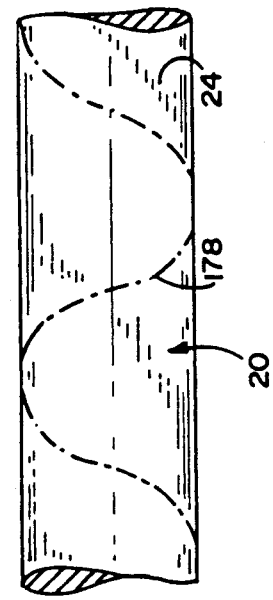
FIG. 7 is a top plan view of the rail with the path of points measured shown in phantom.
Figure 6:
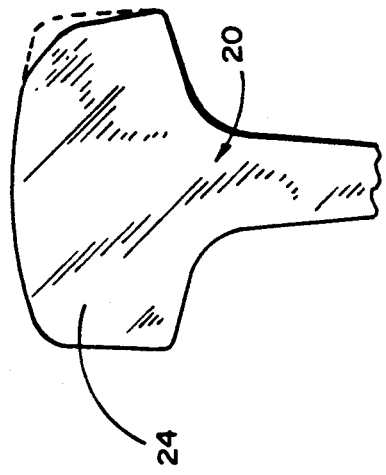
FIG. 6 is an end view of a rail having a deformed rail head with the original shape shown in phantom.

In the preferred embodiment, the rail measuring apparatus 10 includes a base 12, an actuating unit or moving means 14, a carriage 16 and a sensing device 18. The apparatus 10 is driven along the length of a rail 20 by any appropriate driving means, such as a rail trolley 22 (FIG. 5). Such a trolley is typically, in turn, attached to a rail truck for movement. As the trolley is drawn along the track, an eccentric-drive actuating mechanism reciprocates the carriage 16 and sensing device 18 laterally across the rail. The sensing device therefore traces a sinusoidal path on the rail head as illustrated in FIG. 7. The apparatus is utilized to measure the profile of the rail head 24 such as that seen in FIG. 6.

Figure 1:
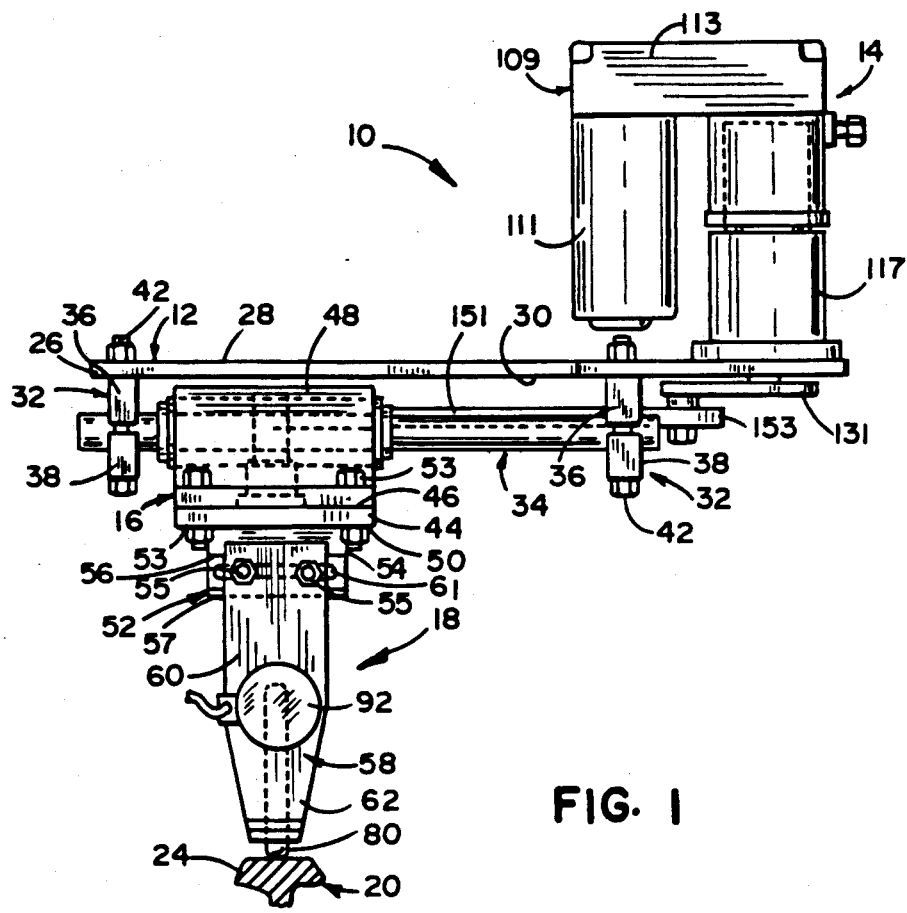
FIG. 1 is a front elevational view of the rail measuring apparatus of the present invention.
Figure 2:
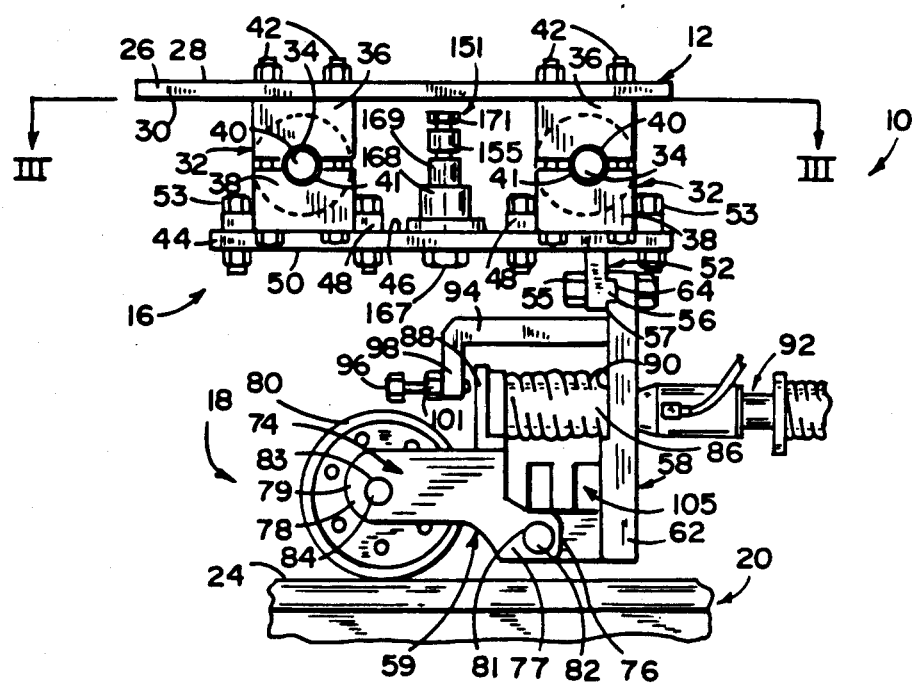
FIG. 2 is a side elevational view of the rail measuring apparatus with the electric motor, gear reduction unit and crank shaft omitted for clarity.
Figure 3:
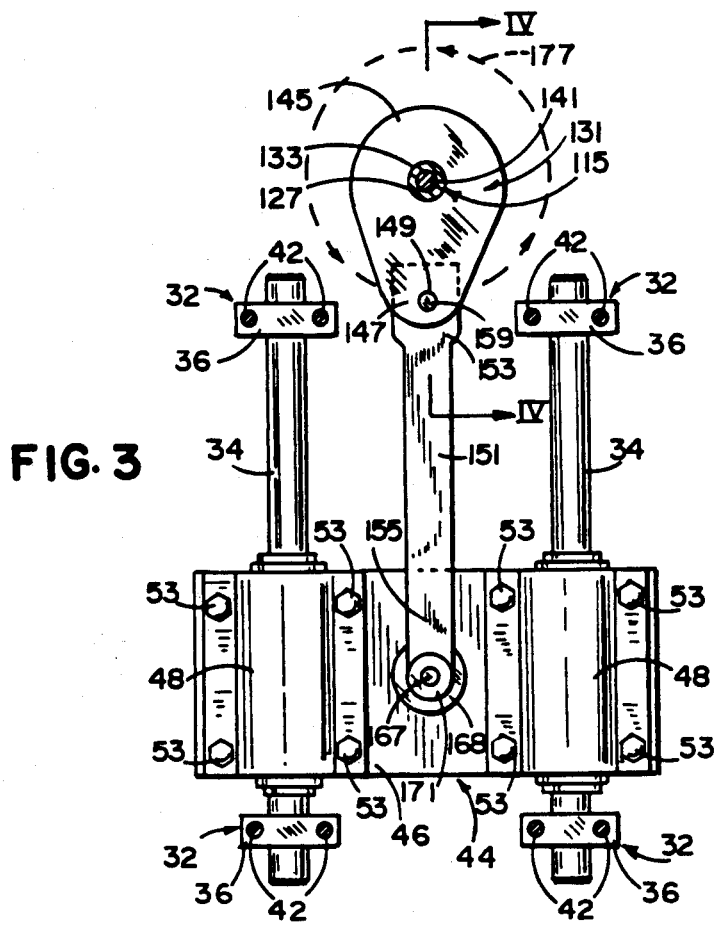
FIG. 3 is a cross-sectional view taken along the line III—III in FIG. 2.

Base 12 of the apparatus comprises a base plate 26 which is fixedly secured to the trolley 22 or other driving means in any known manner, such as by bolting (not shown). Base plate 26 is oriented primarily horizontally and includes an upper surface 28 and an opposite lower surface 30 (FIGS. 1 and 2). Attached to and extending downwardly from lower surface 30 are a plurality of brackets 32 mounting a pair of spaced apart, parallel guide rods 34. Guide rods 34 are preferably circular in cross-section, although other shapes could be used. Each bracket 32 is of a conventional design and preferably includes a proximate block 36 in direct engagement with lower surface 30 of base plate 26 and a corresponding distal block 38 in alignment therewith. Each block 36, 38 includes an opposing arcuate recess 40, 41 into which the appropriate guide rod 34 is placed and gripped. The gripping force is provided by a pair of bolts 42 extending through each block 36, 38 and base plate 26, and drawing the blocks together Carriage 16 is movably mounted to base 12 to facilitate the lateral movement of sensing device 18, as will be discussed below. Carriage 16 includes a carriage plate 44 spaced downwardly from base plate 26 and oriented substantially parallel therewith (FIGS. 1-3). Carriage plate 44 includes an upper face 46 mounting a pair of spaced apart bearing assemblies 48 and a lower face 50 securing a mounting leg 52. The bearing assemblies 48 are of conventional design and are adapted to attach to carriage plate 44 by bolts 53 or the like and to slidingly engage and circumscribe guide rods 34 (FIGS. 1 and 3). Bearing assemblies 48 function to precisely guide carriage 16 in a lateral linear reciprocation defined by guide rods 34. The lateral movement of the carriage is thereby limited solely to a horizontal motion so as to avoid adversely affecting the measuring results generated by sensing device 18.

Mounting leg 52 is preferably L-shaped and includes a vertical segment 54 and a horizontal foot 56 (FIG. 2). Vertical segment 54 is fixed to carriage plate 44 by any known means (such as welding) to project downwardly from lower face 50. At the lower free end 57 thereof, foot 56 extends orthogonally forward to provide a mounting structure for sensing device 18. Free end 57 further includes a lateral slot 61 (FIG. 1), extending through foot 56, which is adapted to receive a pair of mounting bolts 55 therethrough to releasably secure sensing device 18.

Sensing device 18 is utilized to measure the profile of the rail head 24 so that an accurate grinding pattern may be developed. The analysis is accomplished by measuring the vertical position or elevation of each point on the rail over which the sensing element 59 passes. In the most preferred embodiment, sensing element 59 is a pivoting wheel type, although other types of sensors, such as laser beam or other optical sensors, could be used. In any event, the accumulated data is subsequently correlated to determine the specific configuration of the entire rail.

Sensing device 18 includes a main member 58 which is oriented primarily vertically, and includes an upper end 60 and an opposite lower end 62 (FIGS. 1 and 2). Upper end 60 is provided with a groove 64 into which is received foot 56 of carriage 16. Upper end 60 further includes a pair of holes (not shown) which align with slot 61 for receiving mounting bolts 55 to securely attach sensing device 18 to carriage 16. The lower end 62 of main member 58 is provided with an extending mounting flange 70 having a pivot hole (not shown) adapted to pivotally mount sensing element 59.

Sensing element 59 includes a sensing bracket 74 having first and second bifurcated portions 76, 78 each defined by a pair of legs 77, 79, respectively (FIG. 2). The first bifurcated portion 76 is adapted to cooperate with mounting flange 70 to pivotally attach the bracket 74 to main member 58. Legs 77 of first bifurcated portion 76 include aligned openings 81 which are aligned with the mounting flange pivot hole when the legs are straddled about mounting flange 70. A pivot pin 82 is received through openings 81 and the mounting flange pivot hole to movably mount sensing element 59 for pivotal movement in a vertical plane. The second bifurcated portion 78 is adapted to rotatably mount a sensing wheel 80. Legs 79 of second bifurcated portion 78 straddle the sensing wheel 80, and include a pair of openings 83 which are aligned with a central opening (not shown) in sensing wheel 80 for the receipt of axle 84 therethrough. Of course, appropriate bearing and attaching means are used at the connections of both bifurcated portions 76, 78.

Sensing wheel 80 is biased against the rail head 24 by a conventional gas spring 86 (FIG. 2); although, other types of springs could be used. Gas spring 86 is fitted between an upwardly extending shoulder structure 88 fixed to sensing bracket 74 (such as, by welding) and an opposed abutment face 90 of main member 58. A conventional conduit and valving arrangement 92 is provided to operate gas spring 86. Gas spring 86, then, functions to bias sensing wheel 80 downwardly (counterclockwise about pin 82 as seen in FIG. 2) toward rail 20.

An L-shaped stop flange 94 having an adjustable stop 96 on its distal end 98 acts to limit the amount of downward pivoting movement of sensing element 59 (FIG. 2). Stop 96 is adjustably set to prevent the wheel 80 from dropping too low beside the rail head so that the wheel may still easily ride back up on the rail once it has dropped off the side, as will be discussed below. Stop 96 is preferably a threaded bolt received through a weld nut 101 provided on flange 94.

Sensing device 18 further includes a conventional measuring device 105 which measures the vertical movement of the sensing wheel 80 by monitoring the pivoting action of bracket 74 about pivot pin 82 (FIG. 2). This information is transmitted by electrical wiring (not shown) to a computer (not shown) where it is recorded and correlated to determine the profile of the rail head 24.

Figure 4:
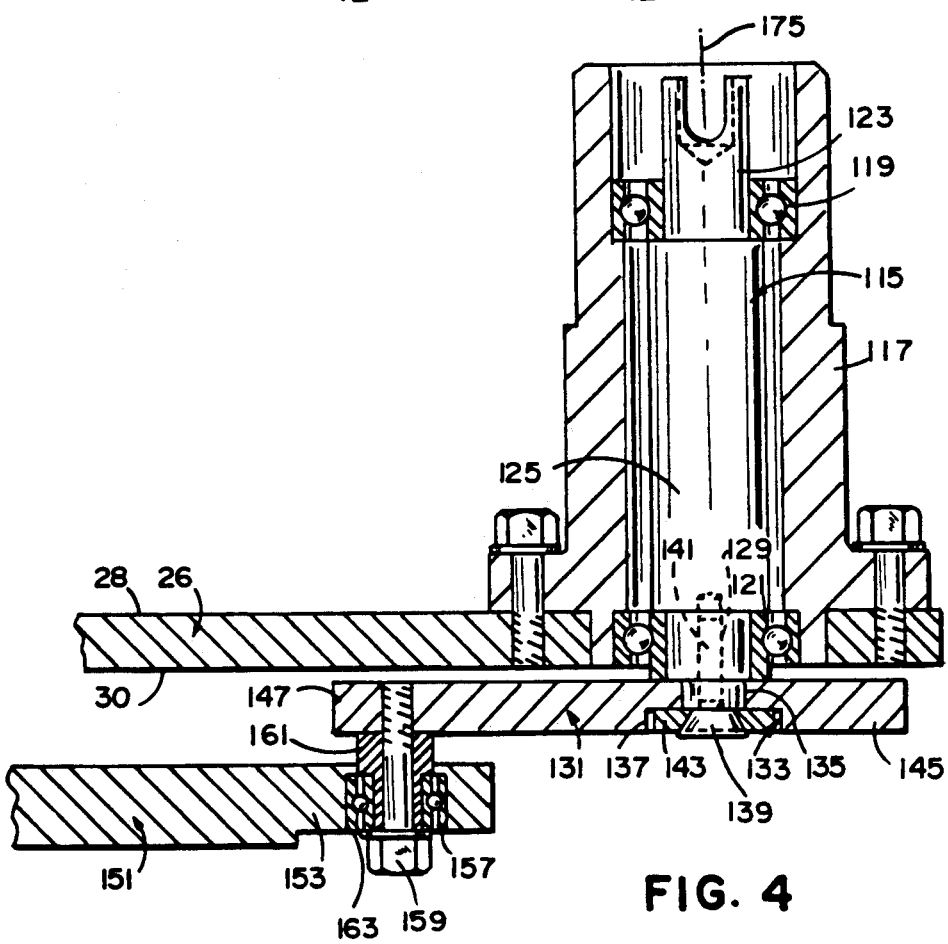
FIG. 4 is a fragmentary cross-sectional view taken along line IV—IV in FIG. 3 with the electric motor and gear reduction unit omitted.

The actuating unit 14 includes a drive unit 109 having preferably a conventional electric motor 111, a conventional gear reduction unit 113, and a crank shaft 115 extending through a housing 117 (FIGS. 1, 3 and 4). Actuating unit 14 is provided to reciprocate carriage 16 and sensing device 18 laterally along the path defined by guide rods 34. The lateral reciprocation is performed at a predetermined rate so that the vertical positions measured by sensing wheel 80 can be correlated to the appropriate point on the rail 20.

Crank shaft 115 is rotatably mounted within housing 117 by bearings 119, 121 (FIG. 4). Crank shaft 115 includes an upper end 123 shaped to matingly engage with the drive shaft (not shown), extending from gear reduction unit 113, to be rotatably driven at a substantially uniform rate. The lower end 125 of crank shaft 115 is shaped to define hub 127 of reduced width, and a longitudinal threaded bore 129 for attaching eccentric member 131 thereto.

Eccentric 131 is a plate member which preferably has a generally rounded egg shape (FIGS. 3 and 4) as like a cam lobe; although the particular shape of member 131 is not critical to the operation of the measuring apparatus 10. A stepped opening 133 is defined in eccentric 131 off-center, near the enlarged rounded end 145. Stepped opening 133 includes a first reduced portion 135 adapted to matingly receive hub 127, and a second enlarged portion 137 adapted to receive head 139 of an attachment bolt 141 and abutment plate 143. This arrangement securely attaches eccentric 131 to crank shaft 115 for rotation therewith. The first reduced portion 135 of opening 133 and hub 127 are preferably circular in shape; but could have many other mating shapes, such as square or hexagonal, if a more positive engagement was necessary for certain environments. Eccentric 131 further includes a threaded bore 149, near the extended narrow portion 147, for attaching thereto an actuating bar 151.

Actuating bar 151 acts to couple the eccentric 131 to carriage 16 and convert the rotational movement of crank shaft 115 into a reciprocal, linear motion for sensing device 18. Actuating bar 151 includes a first end 153 attached to eccentric 131 and a second end 155 attached to carriage 16. More specifically, first end 153 is provided with an opening 157 which receives therethrough an attachment bolt 159 which attaches bar 151 to eccentric 131. Actuating bar 151 is pivotally movable about bolt 159 to facilitate the conversion of rotational movement to linear movement. Further, a spacer 161 and bearing 163 are provided within opening 157 to reduce the frictional forces generated by the pivotal movement of bar 151. Second end 155 of bar 151 defines a pivot hole which receives a pivot rod 167 projecting upwardly from carriage plate 44 (FIG. 2). Preferably pivot rod 167 is a bolt fastened to carriage plate 44, through the use of a threaded nut member 168, although many other arrangements could be used. Actuating bar 151 is pivotally swingable about pivot rod 167 to accommodate the transverse oscillation caused by eccentric 131. Preferably, a bearing assembly (not shown) is provided at this connection. A pair of stops 169, 171 are provided to retain bar 151 on rod 167 at a proper horizontal orientation.

In operation, the rail measuring apparatus 10 is fixedly attached to a driving means, such as trolley 22 (FIG. 5), for substantially steady travel along the length of rail 20. Additionally, the electric motor 111, through gear reduction unit 113, rotates crank shaft 115 at a substantially steady rate. The rotation of crank shaft 115, in turn, rotates eccentric 131 about axis 175. The rotation of eccentric 131, in the direction indicated by arrow 177 (FIG. 3), causes the actuating bar 151 to have a lateral component of movement as the first end 153 thereof is revolved around axis 175 by eccentric 131.

Second end 155 of actuating bar 151 acts to move carriage 16, which is constrained to have only lateral movement due to its sliding attachment to guide rods 34. The lateral reciprocal movement of carriage 16, then, reciprocally moves sensing device 18 in a lateral direction. Hence, as bar 151 moves with eccentric 131, carriage 16 and sensing device 18 are laterally moved in a reciprocal manner.

The lateral movement of sensing device 18 across rail head 24 will be at a non-uniform, generally sinusoidal rate. More particularly, eccentric 131 has a greater lateral component when aligned with the rail 20 (ninety degrees from the position illustrated in FIG. 3), than it does when positioned orthogonally thereto (position of FIG. 3). The lateral movement of actuating bar 151, then, is at a non-uniform rate; which, in turn, drives carriage 16 and sensing device 18 laterally at a non-uniform rate. This action defines a generally sinusoidal path 178 of travel for sensing wheel 80 (FIG. 7) to measure or acquire information at spaced longitudinal points or locations along longitudinal lines at a variety of lateral positions on the rail heads. Nevertheless, each reciprocation is uniform and predetermined, so that the computer can accurately pinpoint each of the measured positions on the rail by correlating the lateral reciprocation with the known longitudinal travel of trolley 22.

Sensing wheel 80, therefore, is driven back and forth across the width of rail head 24 as it is moved longitudinally down the rail (FIG. 7). Preferably, the lateral movement of sensing wheel 80 is greater than the width of rail head 24. This construction enables the apparatus 10 to measure the entire profile of rail head 24. In use, as sensing wheel 80 reaches one of the sides of rail 20, it drops slightly off rail head 24. As mentioned above, stop 96 abuttingly engages shoulder structure 88 and limits the amount of downward pivoting experienced by wheel 80. This point of engagement is selected to permit the lowest needed measurement of rail 20, and yet still facilitate a smooth, continuous re-mounting of sensing wheel 80 on rail head 24 for accurate measurements of the rail profile. Furthermore, the continuous longitudinal movement of sensing wheel 80 down the rail 20, also enhances the ability of the wheel 80 to ride easily back up on the rail head 24.

In this system, the rail head 24 is not continuously monitored at a plurality of transverse points along the length of the rail. Nevertheless, sufficient measurements of the rail head profile are obtained due to the gradual nature of rail deformation and the speed of the reciprocation. Moreover, the present system obtains measurements across the entire width of the rail head, in contrast to prior art devices which measure particular, preselected points on the rail head.

The measurement information acquired by the described system is fed into a digital computer (not shown) for analysis processing. The computer calculates an "optimal" grinding program wherein a compromise is struck between ideal profile shape and material removal. Such algorithms for multi-sensor systems are generally well known to those having ordinary skill in the art. Applicant has not yet developed such an algorithm for the present single-sensor system. After the grinding program is generated, a rail grinder works the track in response to the program to return the rail head profile to the calculated shape.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A rail profile measuring apparatus for measuring the profile of a rail head, said apparatus comprising:
    carriage means for supporting said apparatus for longitudinal movement along the rail head;
    sensing means supported by said carriage means for sensing the position of a point on the rail head; and
    moving means for laterally translating said sensing means across the rail head while said carriage means moves said sensing means longitudinally along the rail head, whereby said sensing means moves both longitudinally and laterally with respect to the rail head to acquire information at a plurality of spaced locations along longitudinal lines on the rail head.

2. An apparatus as defined in claim 1 wherein said sensing means includes a single sensing element.

3. An apparatus as defined in claim 2 in which said sensing element moves along a generally sinusoidal path.

4. An apparatus as defined in claim 2 in which said single sensing element includes a pivotally mounted sensing wheel, wherein said pivotal movement of said sensing wheel is in a substantially vertical plane to measure the elevation of each measured point of the rail head.

5. An apparatus as defined in claim 4 in which said single sensing element further includes biasing means for resiliently biasing said sensing wheel downwardly against the rail.

6. An apparatus as defined in claim 4 in which the path followed by said sensing wheel has a greater width than the width of the rail head, so that measurement of the entire profile of the rail head is ensured.

7. An apparatus as defined in claim 1 in which the lateral travel of said sensing means is larger than the width of the rail head, so that measurement of the entire rail head profile is ensured.

8. An apparatus as defined in claim 1 in which said carriage means includes a base having at least one elongated guide element, and a sensor carriage slidably attached to said guide element and coupled to said moving means for reciprocal movement along said guide element, wherein said sensing means is attached to said sensor carriage for movement therewith along said guide element.

9. A rail profile measuring apparatus for measuring the profile of a rail head as the apparatus is moved along a length of a rail, the rail head having a width defined by a pair of lateral edges, said apparatus comprising:
   sensing means for sensing the position of points on the perimeter of the rail head, said sensing means including a single sensing element having a pivotally mounted sensing wheel mounted for pivotal movement in a substantially vertical plane to measure the elevation of each measured point of the rail head, said sensing means further including stop means for limiting the downward pivoting movement of said sensing wheel when said sensing wheel leaves the rail head at the lateral edges thereof; and
   moving means for laterally reciprocating said sensing means across the rail head as said sensing means travels longitudinally along the rail, said reciprocal path followed by said sensing wheel having a greater width than the width of the rail head.

10. A rail profile measuring apparatus for measuring the profile of a rail head as the apparatus is moved along a length of a rail, said apparatus comprising:
    a base having at least one elongated guide element, said guide element being oriented to define a linear path transverse to the length of the rail to thereby define a lateral path;
    a carriage slidably attached to said guide element;
    sensing means for sensing the position of points on the perimeter of the rail head; and
    moving means coupled to said carriage for laterally reciprocating said carriage with said sensing means along said lateral path defined by said guide element and across the rail head as said sensing means travels longitudinally along the rail.

11. An apparatus as defined in claim 10 in which said moving means includes a crank shaft, driving means for rotating said crank shaft, and converting means for coupling said crank shaft to said sensor carriage and for converting the rotational movement of said crank shaft into the linear lateral movement of said carriage.

12. An apparatus as defined in claim 11 in which said converting means includes a disk mounted on said crank shaft for rotation therewith, and a connecting bar pivotally coupled to said disk at a location spaced from said crank shaft and pivotally coupled to said sensor carriage, whereby said sensor carriage is laterally reciprocated along said guide element as said disk is rotated by said crank shaft.

13. An apparatus as defined in claim 12 in which the lateral travel of said sensing means is larger than the width of the rail head, so that measurement of the entire rail head profile is ensured.

14. A rail profile measuring apparatus comprising:
    a base adapted for longitudinal movement along a rail and having at least one elongated guide element oriented transversely to the rail;
    a carriage slidably mounted on said guide element for movement therealong transverse to the rail;
    an actuating unit mounted on said base and attached to said carriage for reciprocally moving said carriage along said guide element while said base moves longitudinally along the rail; and
    a sensing device attached to said carriage for movement therewith, said sensing device including a sensing element for measuring the elevation of a point on the rail, whereby said sensing device measures points along a reciprocating path on the rail as said apparatus moves therealong to measure spaced locations along longitudinal lines on the rail.

15. An apparatus as defined in claim 14 in which said sensing element is movably mounted for pivotal movement within a vertical plane, so as to measure the elevation of each measured point on the rail.

16. An apparatus as defined in claim 15 wherein said guide element has a longitudinal axis, and wherein said longitudinal axis of said guide element is substantially perpendicular to the vertical plane defined by the pivotal movement of said sensing element.

17. An apparatus as defined in claim 16 in which said lateral travel of said sensing element is greater than the width of the rail head, so that measurement across the entire width of the rail head is ensured.

18. A rail profile measuring apparatus comprising:
    a base having at least one elongated guide element defining a longitudinal axis;
    a carriage slidably mounted on said guide element;
    an actuating unit mounted on said base and attached to said carriage for reciprocally moving said carriage along said guide element, said actuating unit including a crank shaft, means for rotatably driving said crank shaft, and converting means for coupling said crank shaft to said carriage and for converting the rotational movement of said crank shaft into linear movement for said carriage, whereby said carriage is laterally reciprocated along said guide element; and
    a sensing device attached to said carriage for movement therewith, said sensing device including a sensing element for measuring the profile of the rail, said sensing element being movably mounted for pivotal movement within a vertical plane so as to the measure the elevation of each measured locations on the rail, the vertical plane defined by the pivotal movement of said sensing element being transverse to the longitudinal axis of said guide element.

19. An apparatus as defined in claim 18 in which said converting means includes a disk mounted on said crank shaft for rotation therewith, and a connecting bar pivotally coupled to said disk at a location spaced from said crank shaft, and pivotally coupled to said carriage, whereby said carriage is laterally reciprocated along said guide element as said disk is rotated by said crank shaft.

20. A rail profile analyzer comprising:
    measuring means for measuring a point on a rail head of a rail;
    longitudinal motive means for moving said measuring means longitudinally along the rail; and
    transverse motive means for moving said measuring means transversely with respect to the rail concurrently with the longitudinal movement, whereby said analyzer obtains measurements at spaced longitudinal locations at a variety of transverse positions along the rail head.

21. A method of measuring a rail head profile of a length of rail comprising:
    providing a sensing element adapted to measure the elevation of points on the rail head; and concurrently moving said sensing element longitudinally along the rail and laterally across the rail head, such that said sensing element is continuously reciprocated laterally across the rail as it is moved longitudinally therealong to acquire measurements at a variety of lateral positions on the rail head at spaced longitudinal locations for each lateral position.

22. A method as defined in claim 21 wherein said movement of said sensing element defines a generally sinusoidal path.

23. A method as defined in claim 21 wherein said lateral movement of said sensing element is greater than the width of said rail head, so that measurement across the entire width of said rail head is ensured.

24. A method as defined in claim 23 wherein said movement of said sensing element defines a generally sinusoidal path.

* * * * *

UNITED STATES PATENT AND TRADEMARK OFFICE
CERTIFICATE OF CORRECTION

PATENT NO. : 5,009,014
DATED : April 23, 1991
INVENTOR(S) : David J. Leach

It is certified that error appears in the above-identified patent and that said Letters Patent is hereby corrected as shown below:

```
Column 7, Claim 11, Line 46
   insert --sensor-- before "carriage"

Column 8, Claim 18, Line 42
   "locations" should be --location--
```

Signed and Sealed this

Thirteenth Day of October, 1992

Attest:

DOUGLAS B. COMER

*Attesting Officer*   Acting Commissioner of Patents and Trademarks